(12) United States Patent
Tsai

(10) Patent No.: US 8,281,910 B2
(45) Date of Patent: Oct. 9, 2012

(54) BRAKE OPERATING DEVICE WITH MAGNETIC BRAKE SENSITIVITY ADJUSTMENT ARRANGEMENT FOR BICYCLES

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 870 days.

(21) Appl. No.: 12/409,458

(22) Filed: Mar. 23, 2009

(65) Prior Publication Data
US 2010/0236350 A1 Sep. 23, 2010

(51) Int. Cl.
*F16C 1/10* (2006.01)
(52) U.S. Cl. .......................... 188/344; 74/488; 74/502.2
(58) Field of Classification Search ................ 74/480 R, 74/488, 489, 502.2; 188/2 D, 24.22, 151 R, 188/344
See application file for complete search history.

(56) References Cited

U.S. PATENT DOCUMENTS
8,161,840 B2 * 4/2012 Nago ........................... 74/502.2
2008/0314191 A1 * 12/2008 Miki et al. .................... 74/502.2
* cited by examiner Primary Examiner — Christopher Schwartz

(57) ABSTRACT

A brake operating device for bicycles includes a hydraulic fluid cylinder secured to a housing, a parallel cylindrical member on the cylinder and comprising a hollow threaded fastener at one end, a rod in a right portion of the cylinder and having one end connected to a brake lever; a spring biased magnet in the right portion of the cylinder; a plunger interconnecting the magnet and the rod; a spring biased conductor in the cylindrical member and urged by the fastener; and an electric wire interconnecting the conductor and a connector which is connected to a brake lamp. For decreasing a turn-on time of the brake lamp a loosening of the fastener will push the conductor away from the brake lever to decrease a current generated on the conductor due to a movement of the conductor relative to the magnet. Tightening of the fastener can increase the turn-on time.

3 Claims, 3 Drawing Sheets

US 8,281,910 B2

BRAKE OPERATING DEVICE WITH MAGNETIC BRAKE SENSITIVITY ADJUSTMENT ARRANGEMENT FOR BICYCLES

BACKGROUND OF THE INVENTION

1. Field of Invention

The invention relates to bicycle brake and more particularly to a brake operating device having a magnetic type brake sensitivity adjustment arrangement for bicycles (e.g., electric bicycles).

2. Description of Related Art

A conventional brake operating device for an electric bicycle is shown in FIG. 3. The brake operating device comprises a housing 71, a brake lever 72 mounted on the housing 71, a brake cable 73 having one end fastened at the brake lever 72, an operating wire 74 having one end fastened at the housing 71 and being spaced from the brake cable 73, and a contact switch 75 adjacent one end of the operating wire 74.

In a normal pedaling state of the electric bicycle, the brake lever 72 urges the contact switch 75 against the operating wire 74. As a result, the contact switch 75 is closed and the operating wire 74 is deactivated. To the contrary, in response to squeezing the brake lever 72 the contact switch 75 disengages from the brake lever 72 to become open. As a result, the operating wire 74 is activated to pull the brake cable 73 to force brake pads against both sides of the rim of a rotating wheel, thus slowing and stopping the electric bicycle.

Another conventional brake operating device 8 for an electric bicycle is shown in FIG. 4. The device 8 comprises a housing 82 mounted on a handlebar (not numbered), a pivotal brake lever 81 mounted on the housing 82, a magnetic member 83 in the housing 82, and a conductor 84 adjacent the magnetic member 83. A rider may squeeze the brake lever 81 to move the magnetic member 83 relative to the conductor 84 so as to generate a current on the conductor 84 according to Faraday's law of induction. The current can be converted to mechanical energy to brake the electric bicycle.

However, a distance between the magnetic member 83 and the conductor 84 is fixed when the brake lever 81 is not squeezed. Hence, it is impossible of adjusting a brake response time (i.e., brake sensitivity) of a brake lamp if the brake response time is too long or too quick. Thus, the need for improvement still exists.

There have been numerous suggestions in prior patents for brake operating device for bicycles such as U.S. Pat. No. 5,279,179.

SUMMARY OF THE INVENTION

It is therefore one object of the invention to provide a brake operating device having a magnetic type brake sensitivity adjustment arrangement for bicycles so that an optimum brake sensitivity can be obtained by adjustment when the bicycle is in a non-operating state.

The above and other objects, features and advantages of the invention will become apparent from the following detailed description taken with the accompanying drawings.

DETAILED DESCRIPTION OF THE INVENTION

Figure 1:
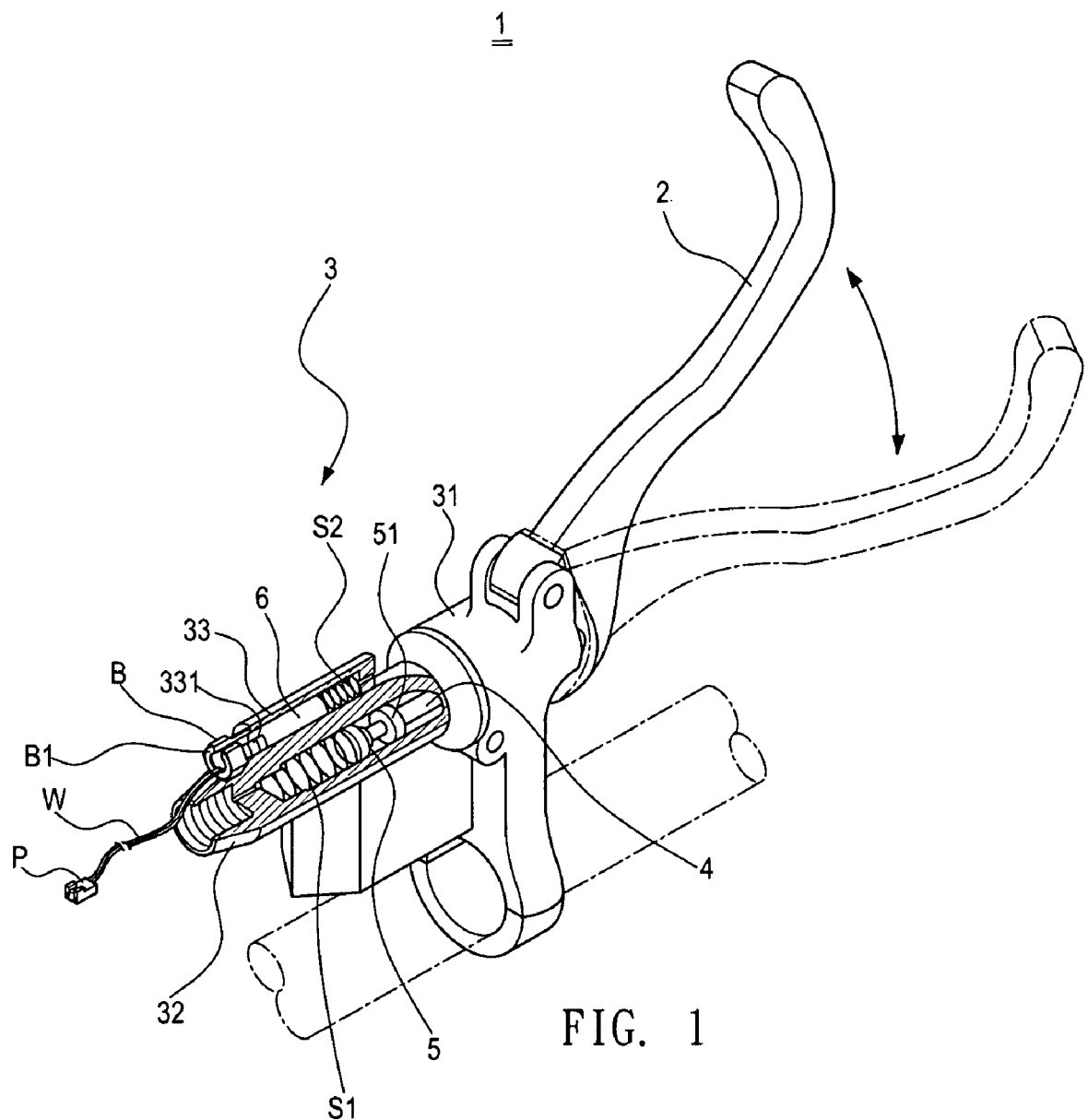
FIG. 1 is a perspective view in part section of a preferred embodiment of brake operating device for an electric bicycle according to the invention.
Figure 2:
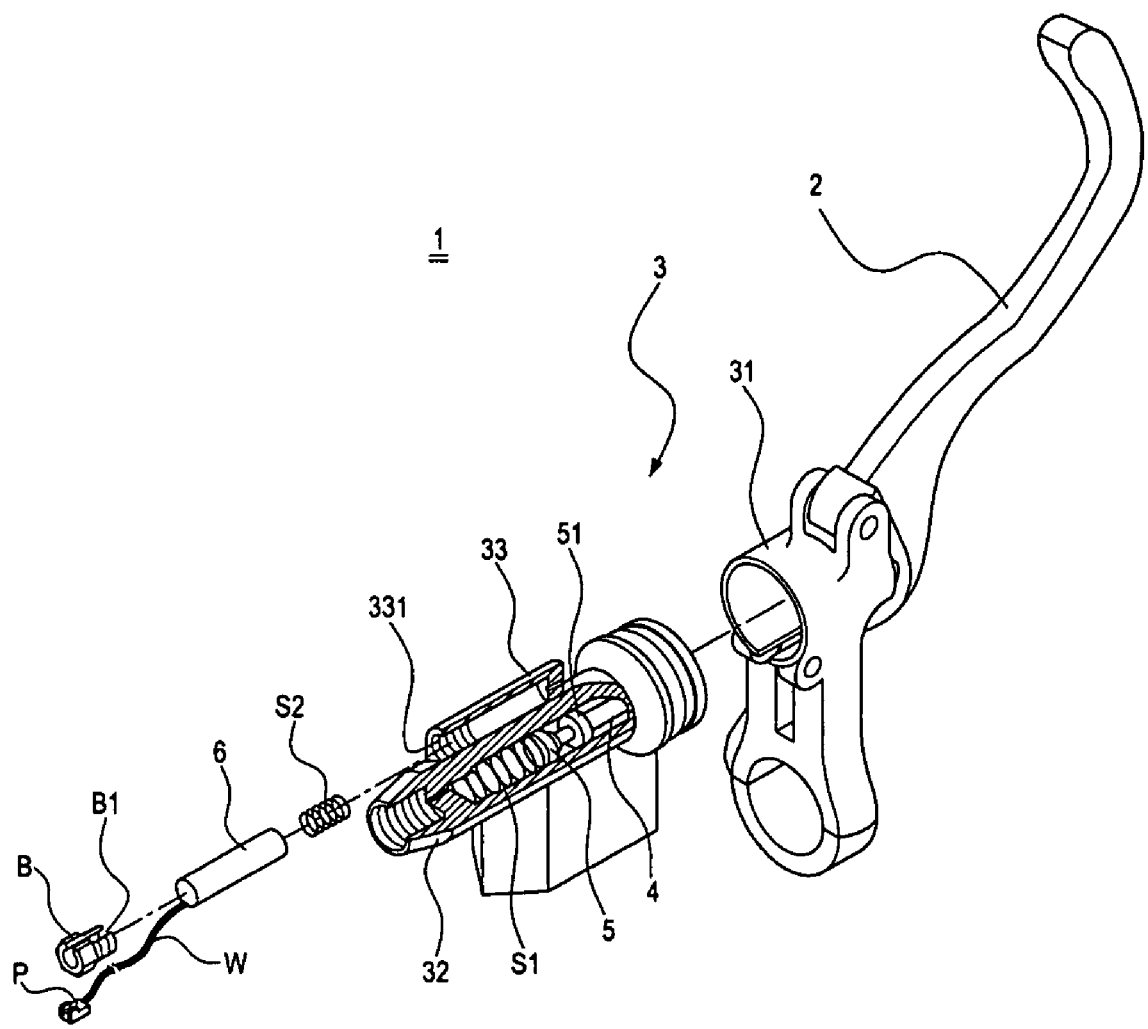
FIG. 2 is an exploded view of FIG. 1.
Figure 3:
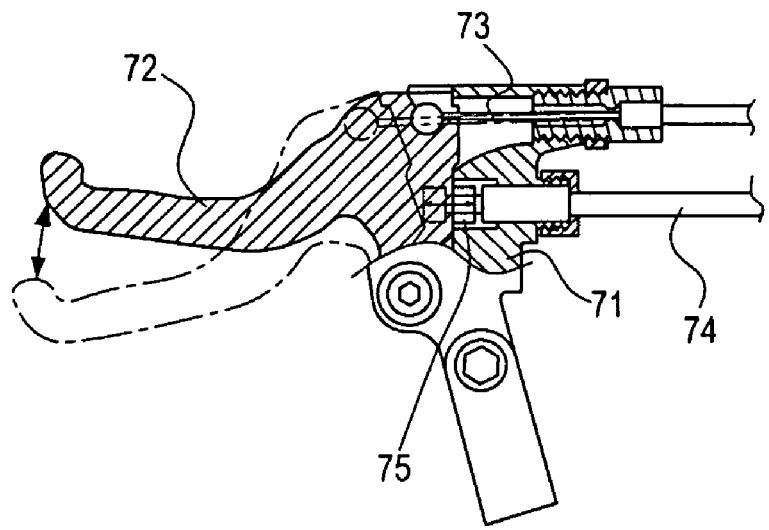
FIG. 3 is a top view in part section of a conventional brake operating device for an electric bicycle.
Figure 4:
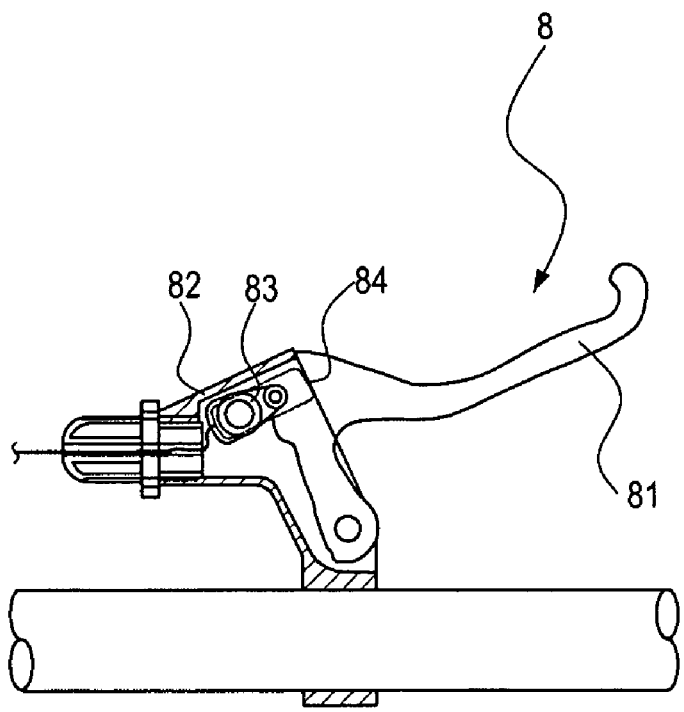
FIG. 4 is a top view in part section of another conventional brake operating device for an electric bicycle.

Referring to FIGS. 1 and 2, a brake operating device 1 for an electric bicycle in accordance with a preferred embodiment of the invention comprises the following components as discussed in detail below.

A housing 3 comprises a case 31 mounted on a handlebar (not numbered). A brake lever 2 is pivotably secured to the case 31. The housing 3 further comprises a hollow cylinder 32 secured to the case 31, and a parallel cylindrical member 33 smaller than the cylinder 32 and integrally formed thereon. An opening of the cylindrical member 33 is disposed distal the brake lever 2. An open end of the cylinder 32 (i.e., at left side of the cylinder 32 in FIG. 1) is in communication with a hydraulic fluid reservoir (not shown). Thus, the cylinder 32 is filled with hydraulic fluid.

A rod 4 has one end connected to the brake lever 2 and the other end passes the case 31 to fasten in the cylinder 32.

A magnetic member 5 is a permanent magnet in this embodiment. The magnetic member 5 is mounted in the cylinder 32 and has a plunger 51 interconnecting the magnetic member 5 and the other end of the rod 4. A first helical spring S1 is biased between an internal shoulder (not numbered) of the cylinder 32 (i.e., distal the brake lever 2) and the magnetic member 5.

A cylindrical conductor 6 is slidably mounted in the cylindrical member 33. A second helical spring S2 is biased between the conductor 6 and a blind end of the cylindrical member 33 proximate the brake lever 2. A hollow threaded fastener B is threadedly secured to an internally threaded section 331 of the cylindrical member 33 at its opening so as to urge the conductor 6 against the second helical spring S2. The hollow threaded fastener B has a lengthwise slit B1 to make the hollow threaded fastener B flexible.

An electric wire W has one end connected to the conductor 6 by passing the hollow threaded fastener B and the other end formed as a connector P which is connected to, for example, a brake lamp.

For decreasing a response time of the brake lamp (e.g., time required to turn on the brake lamp) if the brake is too sensitive, a rider may loosen the hollow threaded fastener B so that the energized second helical spring S2 expands to push the conductor 6 toward a direction away from the brake lever 2 (i.e., toward the opening of the cylindrical member 33 or leftward in FIG. 1). The rider may then squeeze the brake lever 2 to pull the rod 4 and thus the magnetic member 5 rightward to test brake sensitivity. A current will be generated on the conductor 6 in response to moving the magnetic member 5 relative to the conductor 6 according to Faraday's law of induction. But the current generated on the conductor 6 is decreased because they move away from each other in parallel (i.e., less magnetic lines being cut during the movement), resulting in a decrease of brake sensitivity. As an end, the turn-on time of the brake lamp is increased. For example, prior to the adjustment the rider may need to squeeze the brake lever 2 about one third of its full travel angle (e.g., two tenths second is required) to activate the brake lamp. After the adjustment the rider may need to squeeze the brake lever 2 about two thirds of its full travel angle (e.g., four tenths second is required) to activate the brake lamp. Optimum brake sensitivity of the brake lamp can be achieved by doing the loosening operation at least one time. The decreased brake sensitivity can increase safety while riding.

To the contrary, for increasing a response time of the brake lamp if the brake is too insensitive, a rider may tighten the hollow threaded fastener B so as to push the conductor 6 toward the brake lever 2 (i.e., away from the opening of the cylindrical member 33 or rightward in FIG. 1). The rider may then squeeze the brake lever 2 to pull the rod 4 and thus the magnetic member 5 rightward to test brake sensitivity. The current generated on the conductor 6 is increased because they move toward each other in parallel (i.e., more magnetic lines being cut during the movement), resulting in an increase of brake sensitivity. As a result, the turn-on time of the brake lamp is decreased. For example, prior to the adjustment the rider may need to squeeze the brake lever 2 about two thirds of its full travel angle (e.g., four tenths second is required) to activate the brake lamp. After the adjustment the rider may need to squeeze the brake lever 2 about one third of its full travel angle (e.g., two tenths second is required) to activate the brake lamp. Optimum brake sensitivity can be achieved by doing the tightening operation at least one time. The increased brake sensitivity can increase safety while riding.

In addition, at least one second conductor may be provided on the outer surface of the cylinder 32 so as to control, for example, a switch of lamps, on or off of the lamp, or cut-off of fluid line in other embodiments.

While the invention herein disclosed has been described by means of specific embodiments, numerous modifications and variations could be made thereto by those skilled in the art without departing from the scope and spirit of the invention set forth in the claims.

What is claimed is:

1. A brake operating device for a bicycle, comprising, in combination:
    a housing mounted on a handlebar;
    a brake lever pivotably secured to the housing;
    a hydraulic fluid cylinder secured to the housing, the hydraulic fluid cylinder comprising a left portion communicating with a hydraulic fluid reservoir, a right portion, and a shoulder having an axial channel communicating with both the right and left portions;
    a parallel cylindrical member formed on the hydraulic fluid cylinder and comprising a hollow threaded fastener at one end,
    a rod disposed in the right portion of the hydraulic fluid cylinder and having one end connected to the brake lever;
    a spring biased magnetic member having one end urged against the shoulder of the hydraulic fluid cylinder;
    a plunger interconnecting the other end of the magnetic member and the other end of the rod;
    a spring biased conductor slidably mounted in the cylindrical member and urged by the hollow threaded fastener; and
    an electric wire having one end connected to the conductor by passing the hollow threaded fastener and the other end formed as a connector adapted to connect to a predetermined device;
    whereby for decreasing a turn-on time of the predetermined device a loosening of the hollow threaded fastener will push the conductor away from the brake lever to decrease a current generated on the conductor due to a movement of the conductor relative to the magnetic member; and
    whereby for increasing the turn-on time of the predetermined device a tightening of the hollow threaded fastener will push the conductor toward the brake lever to increase a current generated on the conductor due to a movement of the conductor relative to the magnetic member.

2. The brake operating device of claim 1, wherein the magnetic member is a permanent magnet.

3. The brake operating device of claim 1, wherein the predetermined device is a brake lamp.

\* \* \* \* \*